March 4, 1975 M. R. SOMMERIA Re. 28,358

LINEAR AND ROTARY MAGNETIC MOTORS

Original Filed Nov. 29, 1967 5 Sheets-Sheet 1

PRIOR ART DEVICE

LINEAR AND ROTARY MAGNETIC MOTORS
Original Filed Nov. 29, 1967 5 Sheets-Sheet 2
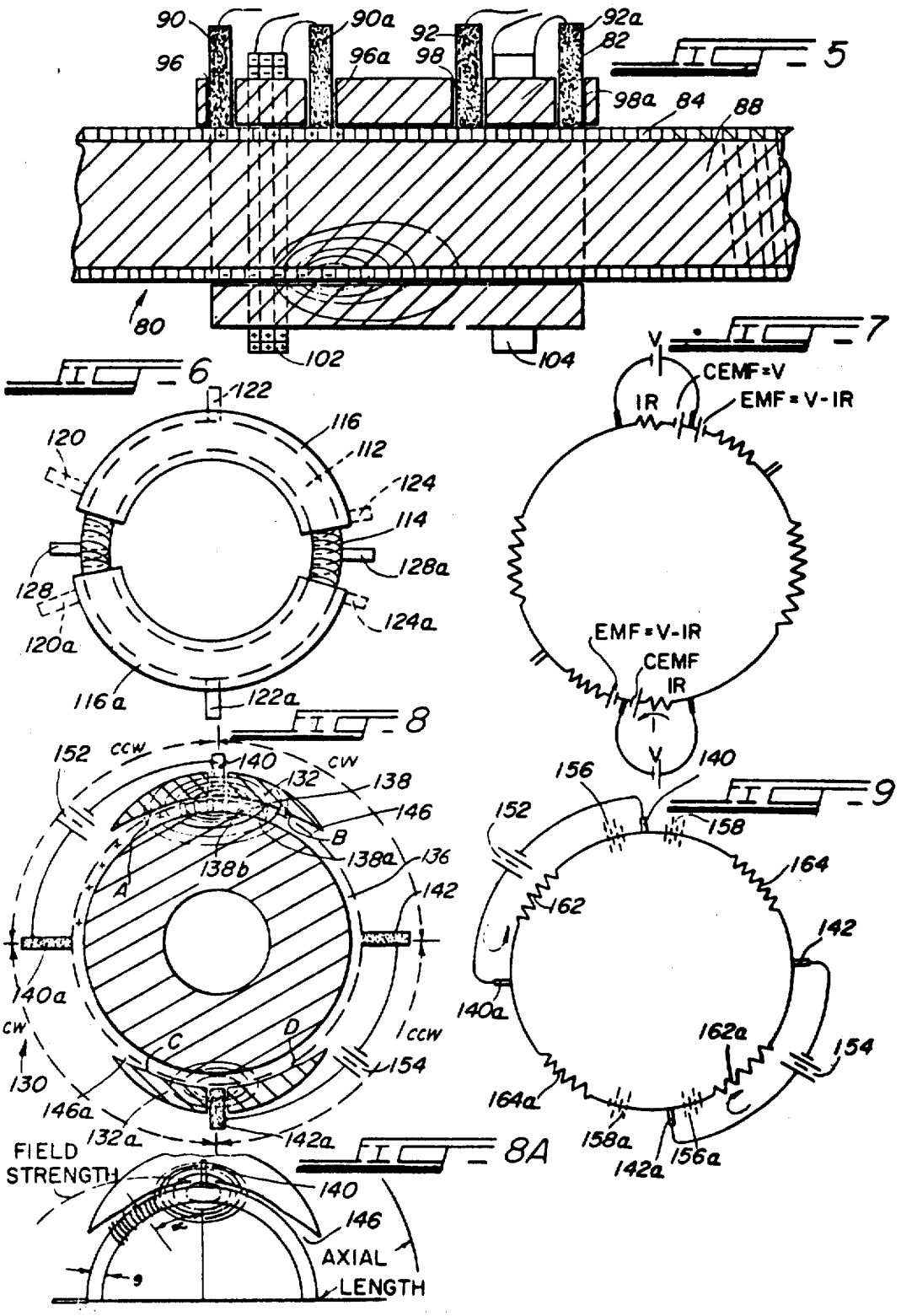

LINEAR AND ROTARY MAGNETIC MOTORS

Original Filed Nov. 29, 1967 5 Sheets-Sheet 3

United States Patent

Re. 28,358

Reissued Mar. 4, 1975

28,358

LINEAR AND ROTARY MAGNETIC MOTORS

Marcel R. Sommeria, Palos Heights, Ill., assignor to Atlanta/La Salle Capital Corporation and Joseph Lucas (Industries) Ltd., Birmingham, England Original No. 3,534,203, dated Oct. 13, 1970, Ser. No. 686,412, Nov. 29, 1967. Application for reissue Oct. 12, 1972, Ser. No. 297,010

Int. Cl. H02k *37/00*

U.S. Cl. 310—14 6 Claims

Matter enclosed in heavy brackets [ ] appears in the original patent but forms no part of this reissue specification; matter printed in italics indicates the additions made by reissue.

ABSTRACT OF THE DISCLOSURE

Electromagnetic machines of low speed and high torque, the machines including both linear actuators and rotary mechanisms, the machines being characterized in that they are devoid of permanent magnets, in that they utilize only a single current-carrying winding, and in that leakage flux associated with magnetic fields developed in the machines are relied upon to effect smooth, nonpulsating, controlled displacement between a stationary and a moving element. It is an important feature of the rotary machine that two separate but essentially identical power input sources are used to effect the control and operation achieved.

This invention relates to electromagnetic machines. More particularly, the invention is directed to electromagnetic D.C. devices based upon the principles of electromagnetic attraction and flux leakage, and in which a single current-carrying winding acts upon ferro-magnetic material to effect motion and to provide useful power. The devices of the present invention, while depending upon and consistent with classical well-established electromagnetic principles, invoke these principles in a novel manner and are materially different from classical D.C. motors and related devices in which two current-carrying windings react on each other in conjunction with associated ferro-magnetic materials. Prior art structures which involve to a considerable extent the same electromagnetic principles utilized in the practice of the present invention include the plunger electromagnets or the leakage type electromagnets. These structures are, however, readily distinguishable and are different in kind from the machines of the invention, such prior art mechanisms lacking effective means for achieving controlled and regulated motion, actuation of the electromagnets being effective merely to shift a plunger or rod.

Although various motors based upon the principles of electromagnetic attraction have been previously described in the literature, each of these prior art mechanisms produces a pulsating discontinuous torque objectionable for many applications and totally unsuited for use in closed loop servo-positioning systems of the type which find utility in controlling the operation of numerically keyed machine tools.

Special motors have been developed for the above and other particular applications, the motors in all cases being based on well-known principles of D.C. motors but utilizing modified construction techniques and arrangements for the purpose of reducing the over-all weight and the inherent associated inertia. A common undesirable and objectionable characteristic of these special motors is that the required horse power rating is achieved through high speed and low torque, whereas the machine tool requires a high torque energizer at low speed. Accordingly, in prior art systems it has been necessary to utilize speed reducers or gear reduction drives in order to achieve the desired power system. In addition to the relatively high cost of such gear assemblies, the assemblies are conducive to a deterioration of the servo loop performance characteristics.

It is the aim of the present invention to provide electromagnetic machines producing high torque at low speeds, and which have low interia and are readily and precisely controllable. It is a principal object of the invention to apply in a new and novel manner a classical principle of electromagnetic machines to provide high-torque, constant-force electromagnetic devices of low inertia and controlled low speed, which devices are competitive in cost of production.

A related object of the invention is to provide improved electromagnetic machines for closed loop servo positioning systems and related uses and obviating the shortcomings of prior art devices.

It is an important feature of the present development that the novel inventive concept evolved has been, in accordance with the practice of the invention, applied to actuators both of the linear and rotary type.

In addition to the characteristics described above, the invention possesses many other advantages and has other objects and features which will become more clearly evident from a consideration of the several illustrative embodiments of the invention described, and depicted in the drawings accompanying and forming part of the present specification. The preferred embodiments will be described in detail to illustrate the general principles of the invention, it being understood that the detailed description is not to be taken in a limiting sense, since the scope of the invention is best defined by the appended claims.

Referring to the drawings:

FIG. 5 is a diagrammatic longitudinal sectional view of another form of a linear actuator of the invention;

FIG. 6 is a schematic representation illustrating evolutionary transition from the linear actuator of the present invention to a rotary actuator embodying the principles of the invention;

FIG. 7 is an electrical schematic diagram showing the IR drops and the counter EMF's developed in the structure of FIG. 6;

FIG. 8 is a diagrammatic representation of a ring and rider assembly in which, in accordance with the present invention, the current in the "armature" winding is limited to flow in only two quarter sections of the winding;

FIG. 8A illustrates, diagrammatically, the field strength distribution at a pole piece of the armature of FIG. 8;

FIG. 9 is an electrical schematic diagram of a circuit correlated with the structure of FIG. 8;

Figure 1:
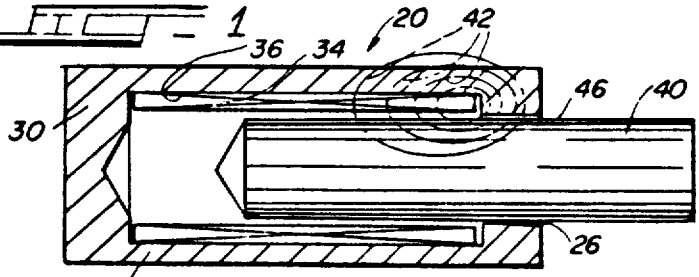
FIG. 1 is a diagrammatic side elevational view, partly in section, and illustrating a prior art device which functions through the same electromagnetic principles upon which the operation of the devices of the present invention is predicated.

The structure and the mode of operation of a linear actuator embodiment of the present invention illustrated in FIGS. 2 through 5 will be described with reference to electromagnetic principles operating or inherent in the well-known prior art device illustrated in FIG. 1. Referring now to FIG. 1 of the drawing, there is shown a diagrammatic representation of a prior art structure which comprises a leakage type electromagnet 20, including a shell or housing 24 generally tubular in form and having an opening 26 at one end and a base wall or floor 30 at the other end. A winding 34 generally coaxial with the housing 24 is disposed sleeve-like on the longitudinally extending inner wall surface 36 of the housing 24, and a core, slug or plunger 40, coaxial with the housing 24 and slidably disposed therein, completes the structure. As indicated schematically in the drawing, the leakage flux 42 passes through the winding 34 before returning through the low reluctance return air gap 46. For this classical arrangement, the force acting upon the plunger 40 is the product of the average field strength in the coil or winding 34 by the circumference of the coil and the total number of ampere turns adjacent to the plunger, as represented by the following formula: F=H I.L.

It is evident that in the prior art structure of FIG. 1 the stroke of the inner plunger or core is limited and invariable, and that the force of the mechanism is a function of the relative position of the core and its surrounding windings. With the prior art basic structure and the well-known and well-established electromagnetic principles as a base, attention is now directed to FIGS. 2 through 5 in which, in accordance with the practice of the present invention, the electromagnetic principles have been utilized in devising the novel linear actuators which constitute one preferred embodiment of the invention.

Figure 2:
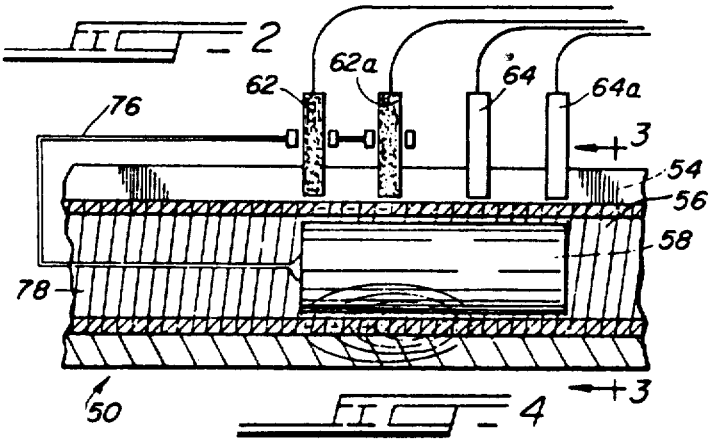
FIG. 2 is a diagrammatic side elevational view, partly in section, and illustrating a linear actuator embodying the principles of the present invention.
Figure 3:
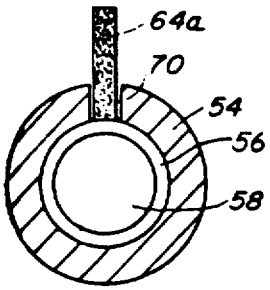
FIG. 3 is a cross-sectional view taken on the line 3—3 of FIG. 2.

Referring now to FIG. 2, there is illustrated, schematically, one form of a linear actuator embodying the features and principles of the invention. The linear actuator 50 includes a tube 54, generally cylindrical in form, about which an electrical winding or a coil 56 is helically wound,. Disposed coaxially within the tube 54 is a slug or core 58 of iron or other material of high magnetic permeability, and positioned to contact and bear upon the winding 56 are two pairs of brushes 62 and 62a and 64 and 64a. As indicated schematically in the cross-sectional view of FIG. 3, the brushes ride in a longitudinally extending slot 70 formed in the tubular cylinder-like or collar 54 which surrounds the coil 56, and non-conductive and mechanical linkage means 76, indicated schematically in FIG. 2, interconnect the brushes to the slidable slug or core 58 whereby longitudinal movement of the brushes in the slot 70 depends upon and is correlated with concurrent axial movement of the core 58 within the bore 78 of the tube 54. In effect, the structure illustrated schematically in FIG. 2 comprises an extension of the basic principles involved in the structure of FIG. 1, but brushes have been added so that the force acting upon the slug or core has been rendered independent of the precise position of the core in the tube. That is, as in the case of the leakage-type solenoid represented in FIG. 1 (as opposed to the air gap type of solenoid) the force produced results from the magnetic flux crossing the very same windings which produce that flux.

Upon energization of the left pair of brushes 62 and 62a of the structure shown in FIG. 2, the electromagnetic field established impels the slug or core 58 to move toward the left, a layer of current following the leading edge of the slug as it moves axially within the tube 54. Upon energization of the right hand pair of brushes 64 and 64a, the propelling force impressed upon the slug 58 urges the slug to the right. From the foregoing description it will be appreciated that irrespective of the direction in which the slug 58 is impelled, as the slug moves it carries with it the wire-contacting brushes, continuously reestablishing during this movement the propelling electromagnetic field necessary to maintain movement in the direction selected. Thus, axial displacement or movement of the slug 58 within the tube 54 is limited only by the length of the tube and by the time period during which current is applied.

Upon comparison and consideration of the diagrammatic and schematic representations of the linear actuator 50 of FIG. 2 and the classical leakage type plunger electromagnet of FIG. 1, it will be appreciated that a principal difference between the two is that in the former the return path for the flux is through a higher reluctance gap, that gap being represented by the thickness of the unenergized winding.

Referring now to FIG. 5, there is depicted a structure which evolves from the structure of FIG. 2 and comprising a linear actuator 80 in which the member or slug 82 is disposed annually outside of the winding 84, the annual sleeve 82 sliding over and along a core or rod 88 on which the coil 84 is wound. The advantage of the structure shown as compared with the structure of FIG. 2 is that in FIG. 5 the brushes 90 and 90a and 92 and 92a, carried in respective slots 96 and 96a and 98 and 98a, are carried directly by the moving sleeve or slug 82, interconnecting linkage having been eliminated In the structure of FIG. 5 demagnetizing windings 102 and 104 are used so as to avoid saturation of the magnetized rod by outside leakage.

Figure 4:
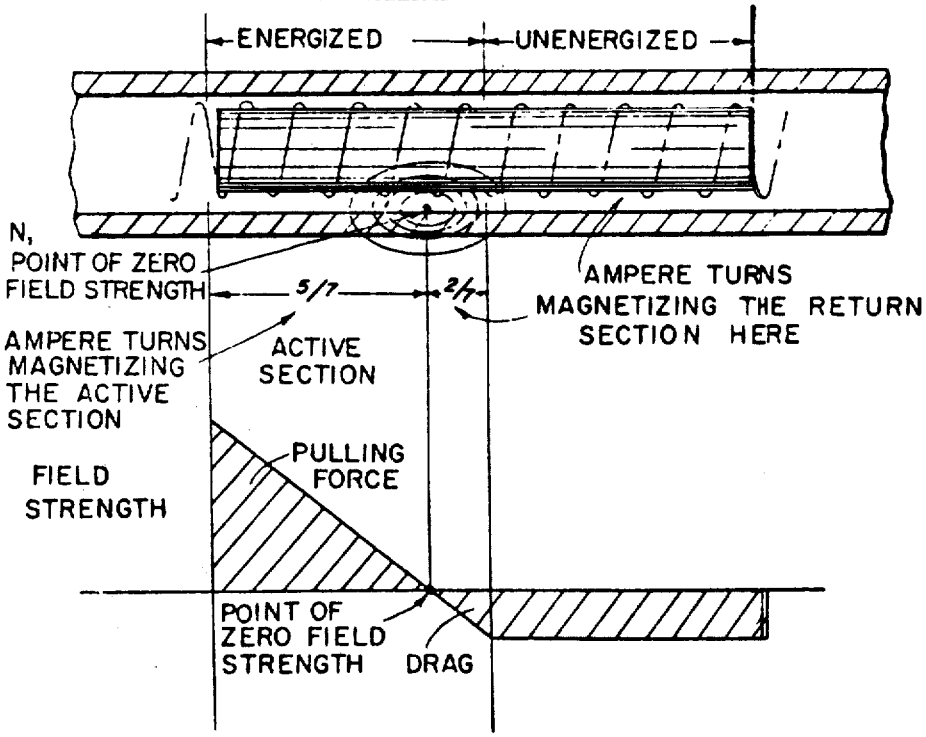
FIG. 4 is a diagram illustrating the relationship between field strength and length of a linear actuator and explanatory of apparatus according to the invention.

The situation obtaining for a case in which the unenergized section is equal in length to the energized section is illustrated [diagrammaticelly] *diagrammatically* in FIG. 4. In the system illustrated, about $\frac{5}{7}$ of the total number of ampere turns are used in the active section and the remaining $\frac{2}{7}$ in the return section. The $\frac{2}{7}$ fraction of the ampere turns creates a drag of about $\frac{1}{10}$ of the main force generated by the $\frac{5}{7}$ fraction, as shown in FIG. 4 which includes a diagrammatic representation of the relationship between field strength and length. FIG. 4 has been prepared in accordance with the following premises:

(1) The field strength of the unenergized section is constant;

(2) The field strength in the energized section varies linearly with distance;

(3) The two shaded areas are equal, since the leakage flux and the return flux are equal;

(4) The small triangle represents a drag and the larger triangle represents the main pulling force; and (5) The point where the ramp crosses the zero line is the point of zero field strength in the gap.

The field strength within the winding of the device of FIG. 4 is a function of only the distance from the neutral point N and the current density within the copper It is here assumed that the winding fills the entire gap between the slug and the tube. Under the above conditions the following definitions and formula apply.

Let g be the radial gap (cm.).

Let $\vartheta$ be the current density (amp/cm.$^2$).

Let x be the distance (cm.) from the origin N.

The ampere turns at point x are: $x \cdot g \cdot \vartheta$.

The formula for the field strength, H, at point x is, in gauss:

$$H=\frac{4\pi \text{ amp turns}}{10 \text{ gap}}=\frac{4\pi x\cdot g\cdot\delta}{10\ g}=1.25\delta x$$

The structures illustrated in FIGS. 2 and 5 represent two simple forms of the linear actuator of the present invention. However, the inventive concept of the subject invention is not limited to and does not pertain solely to linear actuators but includes rotary devices as well. The evolutionary and inventive steps involved in proceeding from the linear to the rotary actuators are explained below. If the rod 88 of FIG. 5 is bent to form a ring, there is produced a structure which is akin to the "Gramme ring" ancestor of D.C. machines discovered early in the development of D.C. motors. Upon removal of the de-magnetizing windings 102 and 104 of FIG. 5, there is obtained a structure similar to that illustrated in FIG. 6, the two center brushes 90a and 92 having been combined to form a single brush. That is, a portion of the structure shown in FIG. 6 comprises a ring-like core, rod or bar 112, a winding 114, helical in form, encircling the rod 112, and a hollow sleeve-like element 116 encircling the wire wound rod 112 and disposed to move annularly about a center corresponding to the center of the ring 112. The sleeve 116 carries brushes 120, 122, and 124 and 120a, 122a, and 124a.

The electromagnetic structure produced through the simple modifications thus far described is incomplete, unsatisfactory, and ineffective as a rotary actuator for several reasons. In the first place, the ring 112 carries a longitudinal flux and, thus, no leakage can occur within the moving member or sleeve 116. However, through the expedient of a second moving member or sleeve 116a, and brushes 120a, 122a, and 124a, the created electromagnetism will oppose that of the sleeve 116 permitting the required leakage to occur and establishing north-south poles on either side of the ring 112. In the final structure of FIG. 6, adjacent brushes 120 and 120a are combined as are adjacent brushes 124 and 124a to form, respectively, brushes 128 and 128a.

In the structure illustrated in FIG. 6 the developed voltage drops will oppose each other preventing current from circulating outside the particular brushes energized. The IR drops and the counter EMF's developed are indicated schematically in FIG. 7. The problems posed have been solved, in accordance with the practice of the present invention, by providing in the structure 130, indicated schematically in FIG. 8, two distinct elements 132 and 132a which constitute two separate "riders." Each sector 132 and 132a has its own pair of actuating brushes 140 and 140a and 142 and 142a, certain brushes of the parent structure of FIG. 6 having been combined to simplify the arrangement of the final mechanism. The brushes are shown schematically as bearing on the winding 138. However, a regular commutator may be used.

Referring further to FIG. 8, the over-all ring and rider assembly is conveniently represented as divided into four quadrants, quadrants marked CCW being energized for counter-clockwise rotation, and quadrants marked CW, for clockwise rotation. A principal and very important difference between the "armature" structure of the invention and conventional armatures is that the current in the armature winding of the invention must be limited to two quarter sections of the winding, with no current in the remaining portion or remaining two quarters of the winding. In the conventional, prior art machines, every conductor carries current. In FIG. 8, the current distribution is indicated schematically, those portions of the winding marked with plus insignia representing current "going" while the minus insignia or signs represent current "return" through the relatively low reluctance gaps 146, and 146a, these gaps being analogous to the return gap 46 of FIG. 1. For counterclockwise rotation, the upper left and lower right quarter sections are energized by applying power between brushes 140 and 140a and between 142 and 142a from two isolated sources.

In order to achieve the essential requirement that current be limited to only two of the four sections of the winding, in accordance with the practice of the invention, two isolated sources of power, 152 and 154, shown schematically in FIGS. 8, 9, 10 and 11, are utilized, each feeding a respective pair of brushes 140 and 140a and 142 and 142a energizing diametrically opposed quadrants.

The "legitimate" counter EMF's are represented schematically in FIG. 9 as batteries 156 and 156a, and the EMF's generated, as the motor rotates through the return fluxes crossing the gaps 146 and 146a (FIG. 8) are schematically as a second set of batteries [168] *158* and 158a. In FIG. 9 the winding is represented as four indentical resistors 162, 162a, 164 and 164a. Upon consideration of the schematic circuit, it is clear that points 140 and 142 are at the same potential and that, thus, there will be no current flow in the quadrant 140–142. The same condition exists for the quadrant 140a–142a since these points are also at the same potential. However, as the moving member of the motor rotates, the return fluxes crossing the gaps 146 and 146a (FIG. 8) will generate the two counter EMF's shown schematically as batteries 158 and 158a in FIG. 9. The required balance of current will not be upset, provided that a power supply having two, isolated power feeds is used.

Figure 10:
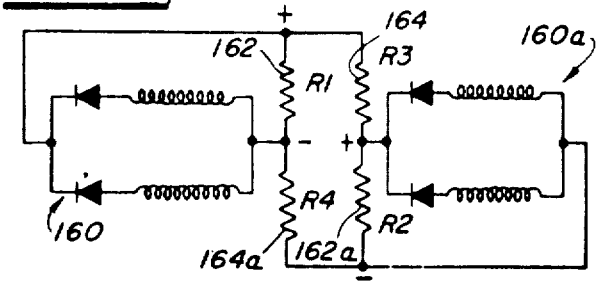
FIGS. 10 and 11 are equivalent circuits for the arrangement illustrated in FIGS. 8 and 9 and including two separate power supplies, in accordance with the invention.
Figure 11:
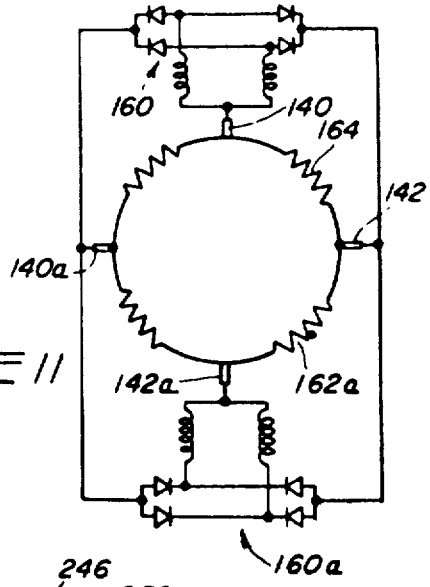

The power supply itself does not, per se, constitute a novel element of the subject invention, any suitable circuit being satisfactory. However, for the purpose of disclosure, a preferred power supply circuit is illustrated schematically in FIGS. 10 and 11. The circuit utilizes electronic controls and two transformer windings with two sets of silicon controlled rectifiers 160 and 160a fired by the same pulses, but actuated in pairs. Two other rectifiers would be used to produce the opposite rotation. In FIG. 10 the ring assembly of FIG. 8 is represented schematically as a bridge of four resistors 162 and 162a, and 164 and 164a. Referring further to FIG. 10, it is clear that if resistors 162 and 162a are subjected to the same voltage, zero voltage is applied across the resistors 164 and 164a and no current will circulate through these elements. However, upon rotation of the motor, an electromotive force will be generated by the return flux through resistors 164 and 164a and a counter EMF will be generated in resistors 162 and 162a. It is evident that while the electromotive forces involved will not disturb the balance of current, a potential difference will exist between the two sources.

In the final arrangement of the rotary actuator achieved through the modifications enumerated above and shown schematically in FIG. 8, only the pole "shoes" of a conventional machine remain, the bodies of the poles as well as the connecting frame having been eliminated. Aluminum, or other light metal elements, not shown, link the two shoes 132 and 132a to make up the frame of the motor.

While in the simplified and schematic representation of the invention illustrated in FIG. 8, the brushes 140, 140a, 142 and 142a are shown as making direct contact with the winding, a commutator arrangement is preferred. The winding 138 comprising a ribbon-like member is wound on end, and alternate windings or turns 138a are displaced radially inwardly so that the brushes contact only every other turn 138b of the winding. In FIG. 8, the dotted lines or — signs indicate the "short" ribbons of the winding, and the + signs, the "long" ribbons. There being only one commutator segment for each pair of going and returning conductors, it is clear that the brushes make contact with only either the going or returning conductors. An alternate solution is to arrange the conductors of the windings in two levels, for example, the "going" on top, and the "returning" on the bottom.

Since a continuous distributed windings always includes two identical parallel paths, a duality of components is found in the motors of the invention, whereas the prior art solenoid structure has only a single set of components. For example, the two pole pieces 132 and 132a of FIG. 8 are analogous to the plunger 40 of FIG. 1; the two halves of the distributed windings 138 are analogous to the single winding 34 of FIG. 1. Finally, the return core, 136, although single, carries the two return fluxes and is, thus, analogous to the return shell 24 of FIG. 1.

The controlling principles of electromagnetic theory upon which operation of the machines of the invention is based may be reviewed briefly with reference to FIG. 8A. The field strength, H, in the winding depends only upon the distance x from the brush 140 and upon the current density in the winding. The ampere turns at the point x are equal to $x \cdot g \cdot \delta$ where x=distance (cm.)
g=thickness of winding (cm.)
$\delta$=current density (amp/cm.$^2$)

Thus, the field strength at point x will be:

$$H=\frac{4}{10}\frac{xg\delta}{g}=1.25\times\delta\times x$$

(neglecting the reluctance of the return path) FIG. 8A shows, by increasingly crowded lines of force, the increase of field strength with distance, the lines of force being spaced equally in the region of the return gap 146. The points A, B, C, D (FIG. 8) represent the position at which the field strength is equal to the saturation induction of the iron. In order to avoid further increase in induction beyond this point, the spacing separating the pole pieces 142 from the winding may be increased. For example, for a current density of 1000 amp/cm.$^2$ an induction of 25,000 gauss will be established at a distance of 20 cm. from brush 140 or 8 circumferential inches.

The total force applied tangential to the winding, between the brush 140 and the point A is:

$$\left[H_{aver}\times\frac{\text{amp. turns}}{10}\times L\right]\text{ dynes}$$

In the region of variable field strength the average value $H_{aver}$ is one-half the maximum value. The force in the region of constant field strength is computed separately using the constant value of H instead of the average value.

Figure 12:
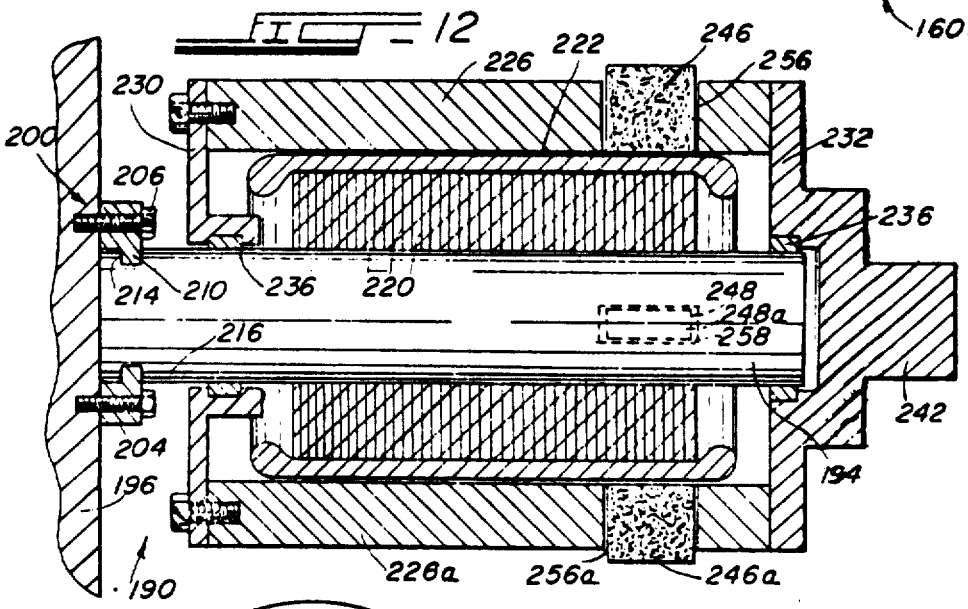
FIG. 12 is a longitudinal cross sectional view of a rotary machine embodying the novel features of the present invention.

FIG. 12 is a longitudinal cross sectional view of a rotary machine embodying novel features of the present invention. As shown, the machine or motor 190 includes an axially extending mandrel or core 194 firmly and fixedly anchored to a stationary frame member 196 by means of a clamping assembly 200 comprising a split ring 204 fastened to the frame member 196 by means of bolts 206, the ring 204 including a radially inwardly directed annular flange 210 keying with the mandrel 194 in a cooperating annular slot 214 formed in the mandrel and extending therearound radially inwardly of an outer peripheral surface 216 of the mandrel 194. The clamping assembly 200 is effective to preclude movement of the mandrel 194 with respect to the frame member 196.

Figure 13:
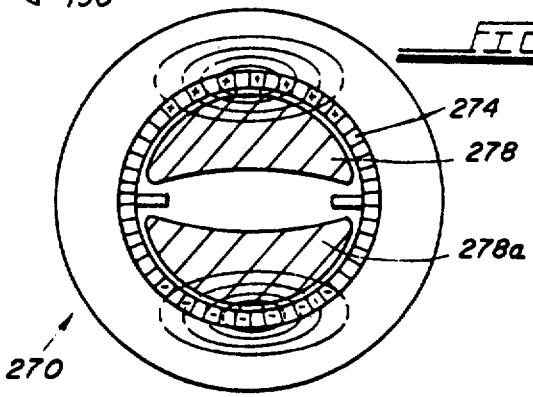
FIG. 13 is a schematic diagram depicting the flux distribution achieved in an electromagnetic motor assembly in which a wire wound armature surrounds the pole pieces.

Laminations 220 stacked axially along the length of the mandrel or core 194 are firmly secured thereto to provide a composite core assembly, and a distributed winding 222 is coiled to encircle the laminated core. In the embodiment of the invention illustrated, the winding 222 takes the form of a ribbon set upon edge, alternate conductors being shorter in order to avoid making contact with the motor brushes. The equivalent winding circuit achieved is represented schematically in FIG. 13.

Diametrically opposed pole pieces 226 and 226a displaced radially outwardly of and generally paralleling the mandrel 194 are anchored at their opposed ends on a pair of end bells or end plates 230, and 232, rotatably supported on the mandrel 194 by means of bearings 236. In the form of the invention illustrated, one end plate 232 is formed to include an integral stub output shaft 242. Brushes 246, 246a and 248, which rotate with the pole pieces 226 and 226a, are carried in corresponding slots 256 and 256a and 258 formed therein.

It will be understood that in the structure of FIG. 12, the core assembly including the mandrel 194 the laminations 220, and the winding carried thereon is stationary while the pole pieces 226 and 226a, and the associated brushes rotate. This particular arrangement affords the least inertia. It will be appreciated, however, that a reversed arrangement in which the pole pieces are fixed and the winding rotates is within the scope of the present invention. Four collector rings necessary in order to bring current to the rotating brushes supply a function well known in the art and have been omitted from the schematic representation of FIG. 12 in order to avoid unduly cluttering the drawing. An electromagnetic motor assembly 60 in which a wire wound armature 274 surrounds the pole pieces 278 and 278a is indicated schematically in FIG. 13.

Figure 14:
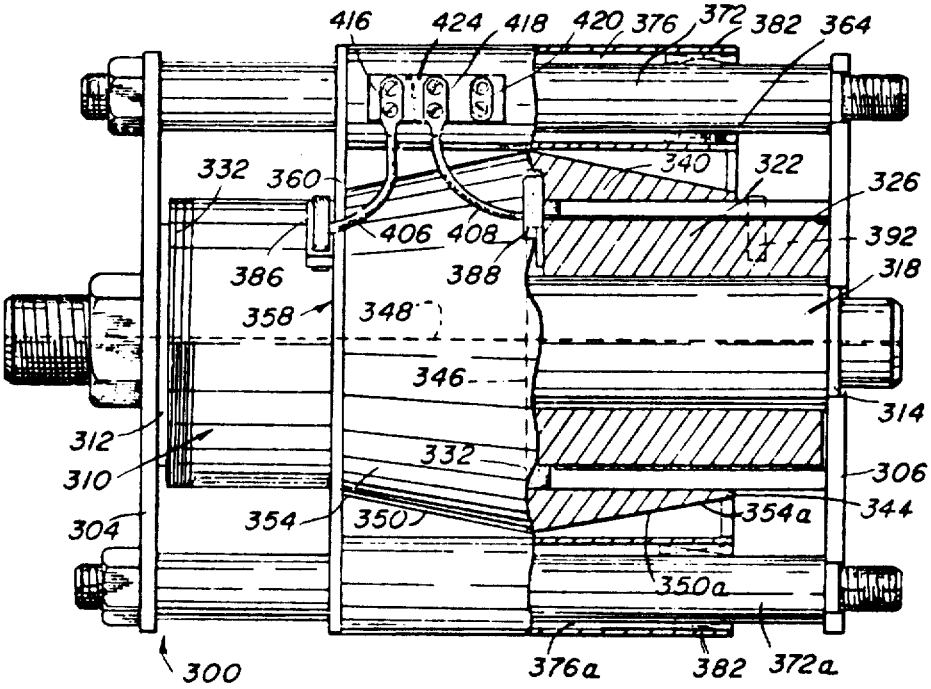
FIG. 14 is a side elevational view, partly in section, illustrating a simple commercial form of a linear actuator based upon the novel concept of the invention.
Figure 15:
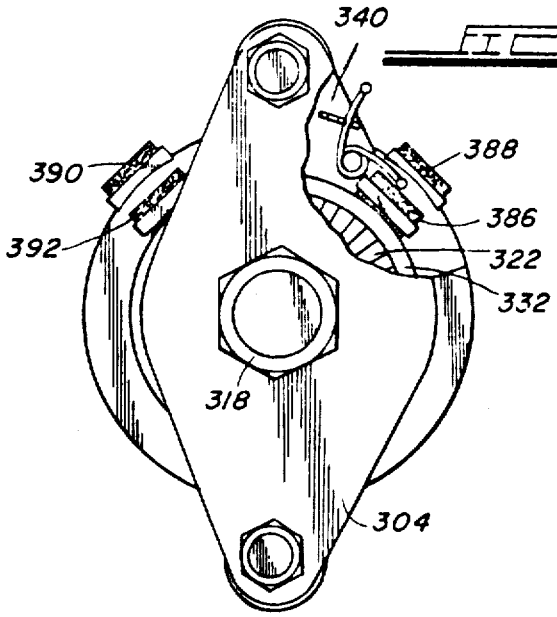
FIG. 15 is an end view of the linear actuator of FIG. 14, with parts cut away.

FIGS. 14 and 15 illustrate a simple commercial form of a linear actuator based upon the novel concept of the invention. The linear actuator 300 of FIG. 14, which is based on the structure illustrated schematically in FIG. 5, includes a pair of end plates 304 and 306 which support a core assembly 310 at its opposed ends 312 and 314. The core assembly 310 itself includes a center shaft 318 to which are secured elongated wedge-shaped sections 322 extending axially along the shaft and projecting radially therefrom, the sections 322 being laminated to one another to form a multi-wedge cylinder encircling the core or center shaft 318. An encircling sleeve or sheath 326 of insulating material encases the outer cylindrical wall surface of the [laminater] *laminated* structure, and a ribbon-like conductor 332 wound edgewise helically about the insulating sheath 326 completes the core assembly.

A pole body 340 fabricated of soft iron or of an equivalent magnetizable material is formed with an axial chamber 344 open at each end and through which the core assembly 310 extends. The pole body 340, which is generally barrel-shaped, defines at its periphery two generally conical surfaces intersecting along a line defining a medial plane 346 of the pole body 340 disposed normally of a longitudinal axis 348 thereof, the respective surfaces 350 and 350a being angled to project radially inwardly from their line of intersection toward opposite ends 354 and 354a of the pole body.

The pole body 340, upon which the electromagnetic pull is ultimately applied, is fastened at its opposed ends to a support frame 358 which includes opposed endwall members 360, and walls 364 normal thereto. The pole body carrying frame 358 rides in turn upon a pair of slide rods 372 and 372a which extend through cooperating channels or openings 376 and 376a of the frame 358, the slide rods extending through and being secured at their respective ends in corresponding endplates 304 and 306. Suitable bushings or bearings 382 are provided between the support frame 358 and the slide rod 372 and 372a to minimize friction as the pole body assembly slides along the rods during the operation of the device.

Brushes 386, 388, 390 and 392, which are carried in corresponding slots formed in the pole body 340 make electrical contact with the winding 332, suitable leads 406, 408 and others, not shown connecting the brushes to terminal junctions 416, 418 and 420 on a terminal strip 424 carried by the pole body support frame 358 for movement therewith. Suitable flexible lines (not shown) connect the terminals 416, 418, and 420 to an electronic control and power supply (not shown).

A linear actuator such as that illustrated in FIG. 14 and in which the overall length of the core assembly is about 15" and the diameter is about 5" would be capable of producing rectilinear motion with a steady pull of approximately 300 pounds and a temporary peak force of about 2000 pounds. Based upon a concept dependent upon the principle of inverted leakage flux, in combination with brushes, the principal features of the mechanism are the "reversed hourglass" body or pole upon which the electromagnetic force acts, the pole body moving from right to left when power is applied between brushes 386 and 388, and from left to right when power is applied between brushes 390 and 392. The core assembly 310, which provides the return path for the magnetic flux, is partially composed of thick laminations, the thickness being dictated by the requirement of relatively slow variation in flux even at high linear speed of the pole body 340. For example, at a speed of 1000 inches per minute there is a flux frequency of only about 4 cycles per second. Moreover, the slight drag created by eddy currents in the unlaminated portion of the core assembly 310 serves as a natural damping means for a closed loop servo positioning system.

As previously explained in detail with reference to FIGS. 8 through 13, the electromagnetic principles invoked to provide the linear actuators of the invention may be utilized as well to provide improved torque and power characteristics in a rotating motor. A simple commercial embodiment of such a motor is indicated schematically in FIGS. 16 and 17, the structure being quite similar to that illustrated in FIG. 12, but including a [comcutator] *commutator* arrangement for connecting the wire wound core and the brushes.

Figure 16:
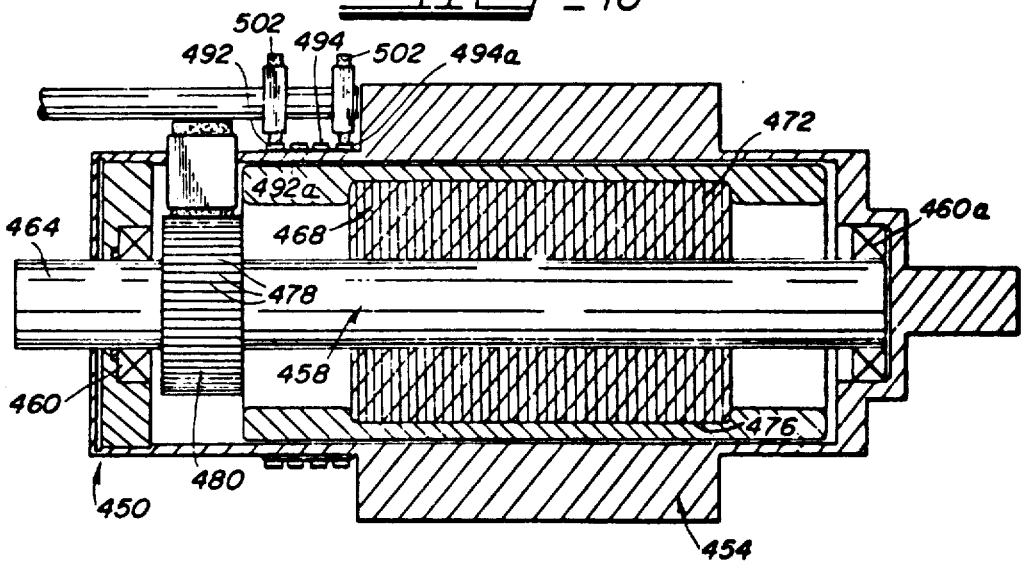
FIG. 16 is a side elevational view, partly in section, illustrating a simple commercial embodiment of a rotary actuator in accordance with the invention, and including a commutator arrangement.
Figure 17:
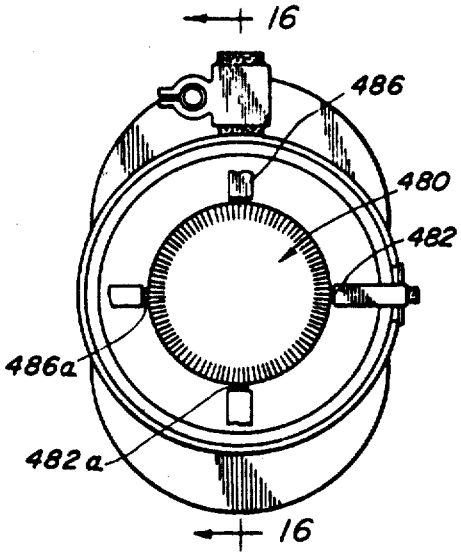
FIG. 17 is an end view of the actuator of FIG. 16 the end plate having been removed to show the brushes and commutator arrangement.

The rotary electromagnetic machine 450 of FIG. 16 includes a housing 454 which supports at opposed ends a core assembly 458 mounted in suitable bearings 460 and 460a to minimze frictional drag during operation of the device. The core assembly 458 includes an elongated mandrel 464 which rides in the bearings 460 and 460a, and about which there is disposed a return core 468 composed of stacked laminations. A coil or winding 472 encircles the core assembly along the length thereof and is physically separated therefrom through a suitable layer of insulating material 476.

[Axially] *Angularly* spaced positions along the winding 472 are connected electrically to segments 478 of a commutator 480 carried on the mandrel 464 for rotation therewith. In the particular preferred embodiment of the mechanism illustrated, two sets of brushes 482 and 482a and 486 and 486a (FIG. 17) contact the commutator, the brushes being spaced at 90° intervals.

It will be understood from the foregoing description considered in conjunction with the drawing of FIG. 16, that as a simple alternative procedure the core assembly 458 may be held fixed and the housing together with the pole pieces carried thereby allowed to rotate. In this latter arrangement it will be necessary to provide means for delivering excitation current to the segments 478 of the commutator 480. In the particular form of the invention illustrated in FIGS. 16 and 17, this is conveniently accomplished by means of four slip rings 492, 492a and 494 and 494a carried by the housing 454 and making contact with cooperating brushes 502. The latter are connected to a power supply in the usual manner.

While certain preferred embodiments of the invention have been illustrated and described in detail, it is to be understood that changes may be made therein and the invention embodied in other structures. It is, therefore, the intention not to limit the patent to the specific construction illustrated, but to cover the invention broadly in whatever form its principles may be utilized.

What is claimed is:

1. A high-torque, rotary, constant-force electromagnetic machine functionally dependent upon leakage flux, said machine being devoid of permanent magnets, and motive force generated by said machine being produced by means of magnetic flux, which crosses a winding which winding itself produces said flux, said machine comprising:

a first element of readily magnetizable material, a single magnetizing winding helically coiled about said first element, a second element generally symmetrically disposed and concentrically supported with respect to said first element, one of said elements defining within pheripheral bounds thereof a cavity, the other of said elements disposed for movement within said cavity and having a cross-section dimensioned to define a separation between said elements, said first and second elements revolving relative to one another during energization of said machine, brush means coupled mechanically to one of said first and said second elements for travel therewith relative to said other of said first and said second elements and in electrical contact with said winding to supply excitation current thereto and to produce a magnetic field within said cavity, to effect relative movement between said first and said second element, two mutually isolated but substantially identical power sources, and electrical conductor means connecting [respective] each of said power sources to [current carrying] said brush means to energize opposed sectors of electromagnetic fields of said machine.

2. The machine as set forth in claim 1 wherein said sectors are quadrants.

3. A flux-leakage-driven, high-torque, constant-force electromagnetic machine devoid of permanent magnets and in which the generated force is produced by a magnetic flux which crosses the very winding which produces said flux, said machine comprising:

a stator comprising stacked laminated elements, a single coil-like current-conducting winding comprising a continuous edgewise-supported ribbon helically wound about and encircling said stator, alternate turns of said ribbon being displaced radially outwardly of turns thereadjacent, a pole piece of ferromagnetic material symmetrically disposed with respect to said stator and supported for movement relative thereto along a path defining a constant radial distance from a center of said stator, brush means carried by said pole piece for movement therewith relative to said stator and in contact with said winding, and electrical conductor means interconnecting said brush means with a source of power to provide an electromagnetic flux effecting movement of said pole piece relative to said stator.

4. The structure as set forth in claim 3 wherein said brush means contact only alternate turns of said ribbon.

*5. A high-torque rotary, constant-force electromagnetic machine functionally dependent upon leakage flux, said machine being devoid of permanent magnets, and motive force generated by said machine being produced by means of developed magnetic flux which crosses a winding which winding itself produces said flux, said machine comprising:*

*a first element of readily magnetizable material,*

*a single magnetizing winding wound about said first element,*

*a second element generally symmetrically disposed and concentrically supported with respect to said first element,*

*one of said elements defining within pheripheral bounds thereof a cavity, the other of said elements disposed for movement within said cavity and having a cross-section dimensioned to define a separation between said elements,*

*said first and second elements revolving relative to one another during energization of said machine,*

*brush means coupled mechanically to one of said first and said second elements for travel there-*

*with relative to said other of said first and said second elements and in electrical contact with said winding to supply excitation current thereto and to produce a magnetic field within said cavity, to effect relative movement between said first and said second element,*

*two mutually isolated but substantially identical power sources, and*

*electrical conductor means connecting each of said power sources to said brush means to energize opposed sectors of electromagnetic fields of said machine.*

*6. A high-torque, constant-force electromagnetic machine devoid of permanent magnets and in which the generated force is produced by a magnetic flux, part of which crosses the very winding which produces said flux, said machine comprising:*

*a stator,*

*a single coil-like current-conducting winding comprising a continuous edgewise-supported ribbon encircling said stator,*

*alternate turns of said ribbon being displaced radially outwardly of turns thereadjacent,*

*a pole piece of ferromagnetic material symmetrically disposed with respect to said stator and supported for movement relative thereto along a path defining a constant radial distance from a center of said stator,*

*brush means carried by said pole piece for movement therewith relative to said stator and in contact with said winding, and*

*electrical conductor means interconnecting said brush means with a source of power to provide an electromagnetic flux effecting movement of said pole piece relative to said stator.*

References Cited

The following references, cited by the Examiner, are of record in the patented file of this patent or the original patent.

UNITED STATES PATENTS

| | | | |
|---|---|---|---|
| 2,553,292 | 5/1951 | Barrett | 310—40 R |
| 2,194,211 | 3/1940 | Sansom | 310—46 X |
| 2,458,569 | 1/1949 | Cummings | 310—90 R |
| 3,581,127 | 5/1971 | Warnett | 310—13 |
| 604,128 | 5/1898 | Smith | 310—35 X |
| 1,933,911 | 11/1933 | Jacobson | 310—14 |
| 2,462,533 | 2/1949 | Moynihan | 310—12 |
| 3,096,467 | 7/1963 | Angus et al. | 310—46 X |
| 3,135,880 | 6/1964 | Olson et al. | 310—14 |
| 3,387,151 | 6/1968 | Selgin | 310—46 |
| 3,287,616 | 11/1966 | McNeil | 310—35 |
| 2,003,647 | 6/1935 | Dillstrom | 310—14 X |

FOREIGN PATENTS

| | | |
|---|---|---|
| 805,223 | 12/1958 | Great Britain. |

DONOVAN F. DUGGAN, Primary Examiner